Feb. 9, 1971   J. TOWNSEND   3,562,803
PLATE BREAKING APPARATUS
Filed Aug. 1, 1969   2 Sheets-Sheet 1

INVENTOR.
JOE TOWNSEND
BY Fulwider, Patton, Rieber,
Lee and Utecht
ATTORNEYS

INVENTOR.
JOE TOWNSEND
BY Fulwider, Patton, Rieber,
Lee and Utecht
ATTORNEYS

United States Patent Office 3,562,803
Patented Feb. 9, 1971

3,562,803
PLATE BREAKING APPARATUS
Joe Townsend, La Palma, Calif., assignor to Centrifugal Products, Inc., Long Beach, Calif., a corporation of California
Filed Aug. 1, 1969, Ser. No. 846,725
Int. Cl. B26f 3/00
U.S. Cl. 225—104           9 Claims

ABSTRACT OF THE DISCLOSURE

An apparatus for breaking brittle plates having flexible backing thereon, such apparatus including a conveyor for advancing the plates along a bed in selected increments. The bed is formed with a transverse depression defining a breaking edge and a breaking head is aligned with such depression and is selectively lowered to engage the plate and break it over such edge. Control means is provided for advancing the conveyor the selected increments and then actuating the breaking head to effect breaking thereof over the breaking edge.

BACKGROUND OF THE INVENTION

Field of the invention

The present invention relates to an apparatus for breaking plates having flexible backing thereon into numerous segments of predetermined size so the plate can conform to a surface having a compound curvature.

Description of the prior art

It has been common practice to utilize an abrasion resistant plate having a flexible backing bonded thereto and manually break such plate into one inch squares so the plate will conform to a curved worn surface and can be bonded thereto for resurfacing said worn surface. There are no devices known to applicant which automatically break resurfacing plates into small segments of predetermined size.

SUMMARY OF THE INVENTION

The plate breaking apparatus of present invention includes a bed formed with a depression which defines a breaking edge and a conveyor advances the plates therealong in selected increments. The breaking head is supported in alignment with the depression and control means actuates said breaking head after each incremental advancement to lower said breaking head and break said plate along a line overlying the depression.

An object of the present invention is to provide an apparatus for automatically breaking a brittle plate into segments of a selected size.

Another object of the present invention is to provide an apparatus of the type described which returns the plate to the operator after the breaking process is completed.

These and other objects and the advantages of the present invention will become apparent from a consideration of the following detailed description when taken in conjunction with the accompanying drawings.

DESCRIPTION OF THE PREFERRED EMBODIMENT

Figure 1:
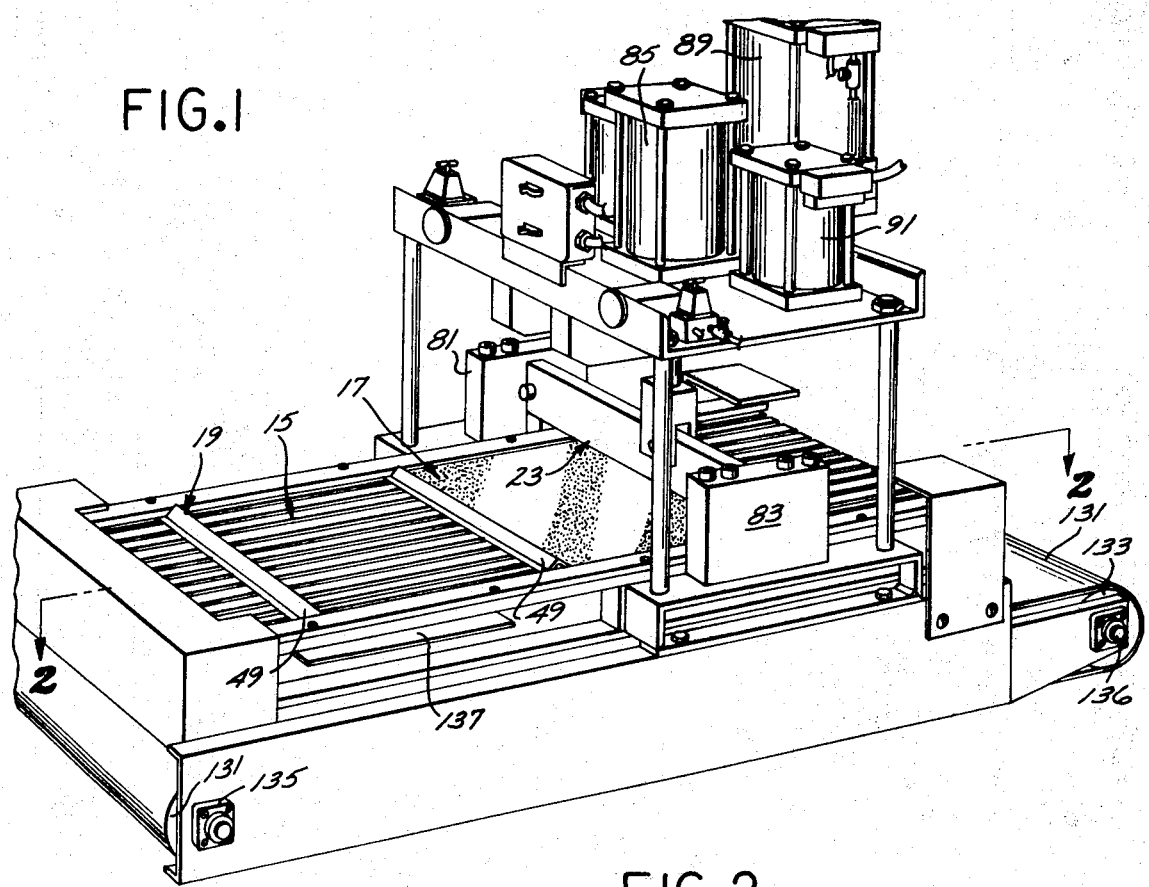
FIG. 1 is a perspective view of a plate breaking apparatus embodying the present invention.
Figure 2:
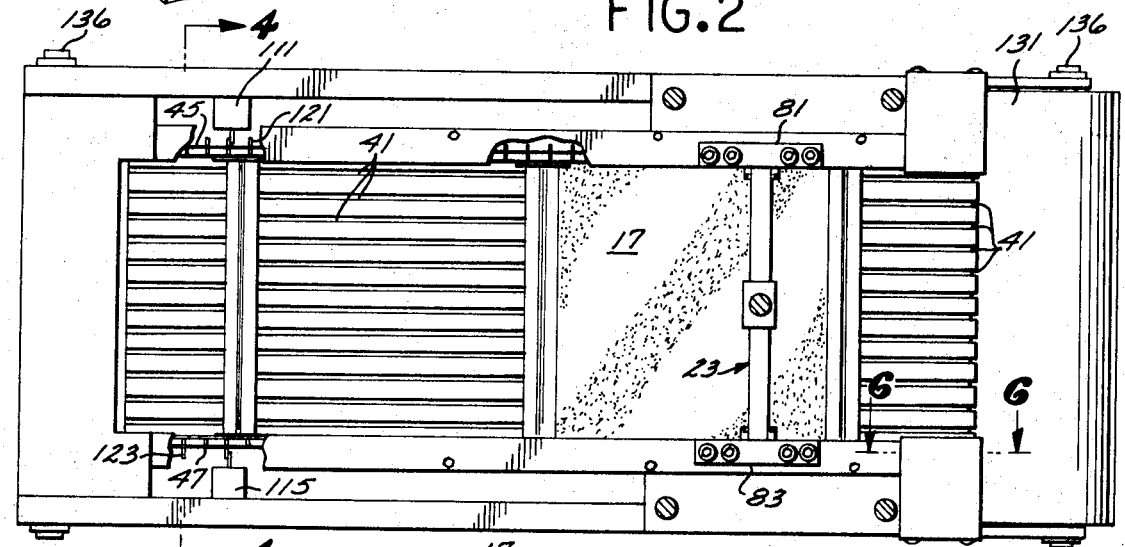
FIG. 2 is a horizontal sectional view taken along the line 2—2 of FIG. 1.

Referring to FIGS. 1 and 2, the plate breaking apparatus of present invention includes, generally, a horizontal bed 15 along which a plate 17 to be broken into segments of predetermined size is moved by means of a conveyor 19. The conveyor 19 is advanced in selected increments and an overhead breaking head 23 is disposed in alignment with a transverse depression 25 (FIG. 7) in the bed 15 and is lowered against the plate 17 while the conveyor 19 is stopped to create a high stress in the plate and effect breaking thereof along a transverse line.

Figure 3:
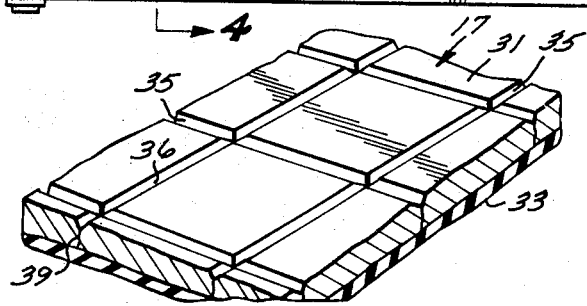
FIG. 3 is a partial perspective view of a plate broken into selected segments by the breaking apparatus shown in FIG. 1.

The plate breaking apparatus of present invention is particularly adapted to break resurfacing plates 17 utilized for repairing worn hard surfaces and sold under the trade name Weargard by Centrifugal Products, Inc. of Long Beach, Calif. Referring to FIG. 3, such resurfacing plates 17 include a metal layer 31 of chrome nickel alloy which is backed up by a flexible material 33 bonded thereto. The layer 31 is scored along lines 35 and 36 extending perpendicularly of one another to define equal sized squares. The apparatus of present invention is then utilized to fracture the layer 31 along the scores 35, as at 39, to enable the plate 17 to conform to compound curvatures whereby the resurfacing plate 17 may be bonded to a curved worn surface and the flexible material 33 removed therefrom.

Figure 7:
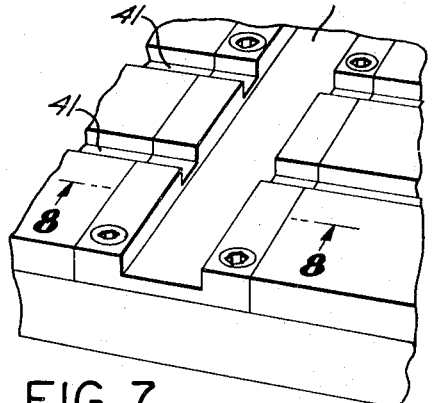
FIG. 7 is a partial perspective view, in enlarged scale, of the bed included in the apparatus shown in FIG. 1.
Figure 8:
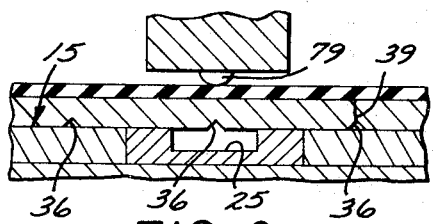
FIG. 8 is a vertical sectional view taken along the line 8—8 of FIG. 7.

Referring to FIGS. 1, 2 and 7, the bed 15 is formed with a plurality of longitudinal troughs 41 for receipt of downwardly projecting tits (not shown) included in certain types of resurfacing plates 17.

Figure 4:
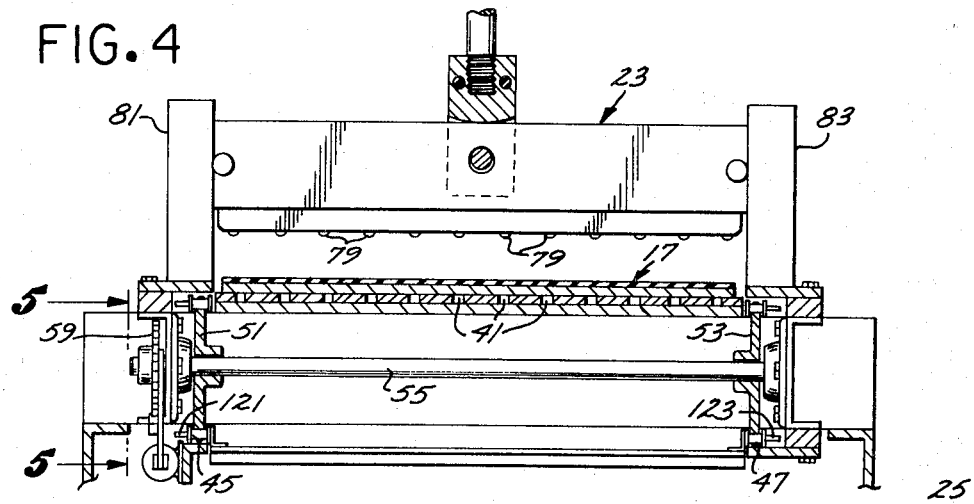
FIG. 4 is a horizontal sectional view, in enlarged scale, taken along the line 4—4 of FIG. 2.
Figures 5, 6:
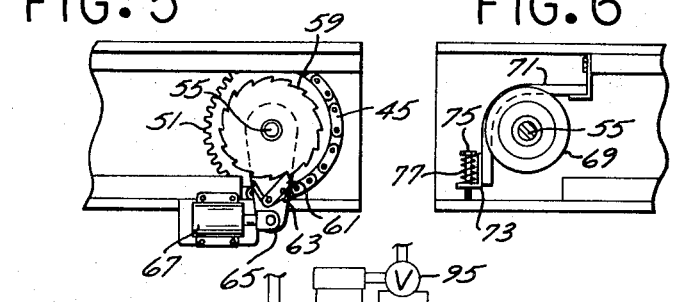
FIG. 5 is a vertical sectional view taken along the line 5—5 of FIG. 4.
FIG. 6 is a vertical sectional view, in enlarged scale, taken along the line 6—6 of FIG. 2.

The conveyor 19 includes a pair of longitudinal chains 45 and 47 (FIGS. 4 and 5) connected together by slats 49 and threaded over respective sprockets 51 and 53 supported at opposite ends of the apparatus by means of journals 55. Referring to FIG. 5, one of the journals 55 rigidly mounts a ratchet wheel 59 which is advanced by means of a pawl 61 biased thereagainst by a torsion spring 63. The pawl 61 is carried on a lever arm 65 which is pivotally carried on the shaft 55 and has its free end connected with a reciprocal solenoid actuator 67 which effects selective actuation thereof.

Referring to FIG. 6, a pulley 69 for a V-belt 71 is supported from the shaft 55 at the right hand end (FIG. 2) of the apparatus. One end of the belt 71 is affixed to an angle 72 and its free end carries an angle 73 having a bolt 75 through a bore in one flange thereof. A coil spring 77 surrounds the bolt 75 and urges the belt 71 firmly into the groove of the pulley 69 to thereby provide for breaking of the conveyor to insure immediate stopping when drive thereof is discontinued.

The breaking head 23 is in the form of a transverse bar which has a plurality of downwardly projecting tits 79 (FIG. 4) which are transversely aligned over the center of the transverse depression 25 (FIG. 7) in the bed 15. The breaking head 23 has its opposite ends received in vertical slides 81 and 83 and is carried from the rod of a working cylinder 85.

Figure 10:
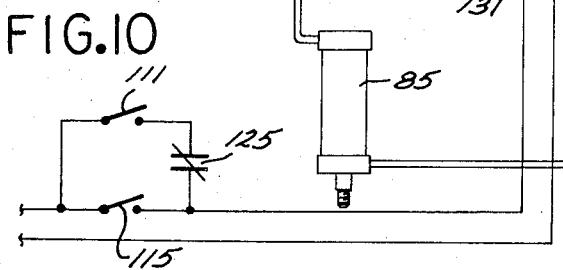
FIG. 10 is a schematic view of a pneumatic-hydraulic system which may be utilized with the apparatus shown in FIG. 1.

Referring to FIG. 10, the control system for the hydraulic work cylinder 85 is commercially available from Miller Fluid Power of Bensonville, Ill., model B4, and includes a pneumatic-hydraulic booster 87 which receives oil from an approach tank 89 for cycling through the hydraulic cylinder 85 and exhaust to a return tank 91. Air to the topside of the piston in the booster 87 is controlled by an air valve 95 and air pressure to the approach tank 89 is controlled by an air valve 97. Air to the other side of the piston in the booster 87 is controlled by an air valve 101 and air to the return tank 91 is controlled by an air valve 103. A manual valve 104 is provided for selectively admitting oil directly from the booster 87 to the return tank 91. The air valves 97 and 103 are controlled by a solenoid valve 107 or, alternatively, by a manually actuated valve 109. The solenoid of the valve 107 is in circuit with parallel connected switches 111 and 115 disposed on opposite sides of the conveyor 19 (FIG. 2) and having their actuators engaged by pegs 121 and 123. It is noted that the pegs 121 are spaced at one inch intervals while the pegs 123 are spaced at two inch intervals so the apparatus can break plates 17 into either one or two inch squares as described hereinbelow. A selector switch 125 is included in series with the microswitch 111 so such micro-switch can be dropped out of circuit when plates 17 are to be broken into two inch squares. When the switch 109 is switched for manual operation, the apparatus is controlled by manual valves 129 and 131.

Referring to FIGS. 1 and 2, a return conveyor in the form of an apron 131 is supported beneath the bed 15 by means of rollers 131 and 133 carried on respective journals 135 and 136. The apron 131 is driven to receive plates 17 off the right end of the bed 15 and return them to the left hand end of the apparatus where the operator may reach under the bed at 137 and grasp them to place them back on the bed 15 for another pass under the head 23.

In operation, a resurfacing plate 17 is placed on the bed 15 and the controls energized to cause the conveyor drive solenoid 67 (FIG. 5) to commence advancement of the conveyor 19. If the apparatus is set up for breaking the plates 17 which are scored for one inch squares, selector switch 125 will be closed and the pegs 121 will contact the switch 111 at increments of advancement of one inch to energize the solenoid valve 107 and commence operation of the hydraulic-pneumatic system. A delay relay (not shown) in series with the drive solenoid 67 de-energizes such solenoid for the short period of time required for the control system to cycle. Actuation of the solenoid valve 107 closes the air valves 101 and 103 to vent the return tank 91 and the lower side of the piston in the booster 87. Simultaneously, the airvalve 97 is opened to pressurize the approach tank 89 to drive oil therefrom and through the pressure chamber in the booster 87 to the hydraulic cylinder 85. When the breaking head 23 is lowered sufficiently to engage the tits 79 with the plate 17, pressure in the control port of the air valve 95 will build up thereby triggering such valve to apply pressure above the piston in the booster 87 to thereby provide high pressure oil to the cylinder 85 and force the tits 79 against the plate 17 in alignment with a transverse score 36 to fracture the layer 31 along a fracture line 39. The control system is set to maintain such high pressure for approximately one second, after which time the air valves 95 and 97 close and 101 and 103 open to thereby retract the pistons in the cylinder 85 and booster 87. At this time the delay relay (not shown) in series with the drive solenoid 67 closes to reciprocate such solenoid and advance the conveyor 19 one inch to again start the control cycle.

The operator will continue to place the plates 17 between each of the slats 49 and the apparatus will continue to operate to break such plates at the selected transverse scores 36 (FIG. 3). When the conveyor 19 advances a plate 17 off the right hand end of the bed 15, such plate will fall onto the apron 131 and will be returned to the left hand end of the apparatus whereby the operator may reach in through the opening 137 and grasp such plate and place it back on the bed 15 rotated 90° from its orientation on its first pass whereby the breaking head 23 may effect breaking along the scores 36 extending perpendicular to the original fractures 39.

Figure 9:
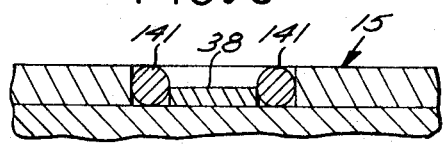
FIG. 9 is a vertical sectional view similar to FIG. 8 and depicting a modification of the breaking apparatus shown in FIG. 1.

Referring to FIG. 9, when resurfacing plates 17 without tits thereon are to be broken, it is desirable to provide a depression 38 in the bed 15 which is formed by a pair of parallel transverse metal dowels 141 to provide for stress concentration thereover.

From the foregoing, it will be apparent that the breaking apparatus of present invention provides a convenient and straightforward means for automatically breaking brittle plates into sections of selected size to enable such plates to conform to a curved surface. The apparatus is straightforward in design, convenient to use, and economical to manufacture.

Various modifications and changes may be made with regard to the foregoing detailed description without departing from the spirit of the invention.

I claim:

1. Apparatus for breaking brittle plates having flexible backing thereon, said apparatus comprising:
   a frame;
   a bed formed with a transverse depression defining a breaking edge over which said plates may be advanced;
   conveyor means supported on said frame for advancing said plates along said bed;
   breaking means supported by said frame and including a reciprocable breaking head aligned with said depression;
   control means for advancing said conveyor means selected increments and for actuating said breaking means to move said head into engagement with said plate to break said plate along a line overlying said depression.

2. Apparatus as set forth in claim 1 wherein:
   said breaking head includes projecting pins forming a line for engagement with said plates to define a line along which said plates are to be broken.

3. Apparatus as set forth in claim 1 wherein:
   said conveyor means includes a plurality of actuating pins spaced therealong at said selected increment; and
   said control means includes an electric switch arranged for actuation by said pins and is responsive to actuation of said switch to actuate said breaking means.

4. Apparatus as set forth in claim 1 that includes:
   a return conveyor disposed under said conveyor means for receiving said plates from one end of said conveyor means and returning them to the other end of said conveyor means.

5. Apparatus as set forth in claim 1 that includes:
   a brake coupled with said conveyor means for positively stopping said conveyor means after advancement said selected intervals.

6. Apparatus as set forth in claim 1 wherein:
   said depression is formed by a transverse trough in said bed.

7. Apparatus as set forth in claim 1 wherein:
   said conveyor means includes a set of actuating pins spaced therealong at selected intervals; and
   said control means includes a switch actuated by said pins.

8. Apparatus as set forth in claim 1 wherein:
   said depression is formed by a pair of parallel dowels extending transversely across said bed.

9. Apparatus as set forth in claim 7 wherein:
   said conveyor means includes a second set of actuating pins spaced therealong at predetermined intervals; and said control means includes a second switch connected in parallel with said first mentioned switch and actuated by said second set of pins and selector means for dropping one of said switches out of circuit whereby said selector means can be adjusted to cause said control system to be actuated by said one switch for plates to be broken into segments of one size or to be actuated by said second switch for plates to be broken into segments of a second size.

References Cited

UNITED STATES PATENTS

| | | | |
|---|---|---|---|
| 240,951 | 5/1881 | Blake | 225—104 |
| 2,354,323 | 7/1944 | Layton | 225—104X |
| 3,141,592 | 7/1964 | Glynn et al. | |
| 3,149,765 | 9/1964 | Horning et al. | 225—97 |
| 3,184,129 | 5/1965 | Kuecht | 225—97X |

FRANK T. YOST, Primary Examiner